Patented Feb. 15, 1949

2,461,553

UNITED STATES PATENT OFFICE 2,461,553

ADHESIVE COMPOSITION CONTAINING POLYCHLOROPRENE RUBBER AND A RESIN OCCURRING IN UTAH RESIN-BEARING COAL

Lino J. Radi, Union City, N. J., assignor to Interchemical Corporation, New York, N. Y., a corporation of Ohio No Drawing. Application March 29, 1946, Serial No. 658,231

2 Claims. (Cl. 260—27)

This invention relates to adhesive compositions and is particularly directed to an improved rubber cement containing a chloroprene rubbery polymer.

Conventional rubber cements have been prepared heretofore from chlorprene rubbery polymers, but such cements have not been especially satisfactory. A particular disadvantage of these cements is that they possess only a fair degree of adhesiveness, which limits their use to a relatively few applications. The films produced from such cements are soft, have very little strength, and possess a fairly high degree of nerve, i. e., they exhibit relatively long legs and are, accordingly, relatively ineffective in providing any substantial degree of adhesion between two surfaces except in certain limited instances.

A further drawback of these cements is their relatively high viscosity, which interferes with their ready application and prevents the building-up of a high solids content therein. These cements gel within a relatively short time upon standing and, accordingly, are not sufficiently stable for storage or packaging over long periods. Moreover, although the solubility of chloroprene rubbery polymers in the customary rubber cement solvents such as naphtha, benzene, toluene, xylene, and the like is improved somewhat by milling, it is not increased nearly to the extent that the solubility of natural rubber is by milling.

A primary disadvantage of these prior cements, however, is that milling of the rubbery polymer and any added compounding materials is required in their preparation. As is well known, not only is there the possibility that, because of undue heating of the rolls of a roll mill during the milling operation, the compounded polymer may improperly or prematurely cure; but there is also the danger that, because of the static electricity generated during the milling operation, the cement solvents may become ignited and thereby cause a serious fire when the milled polymer compound is transferred from the rolls to the mixer.

I have now found that a highly satisfactory rubber cement can be prepared from chloroprene rubbery polymers by incorporating therewith a Utah-type coal resin. The resulting cement is unusually adhesive, and the films produced therefrom are strong and tough. By variation of the amount of coal resin incorporated in the cement, the degree of adhesiveness and the bonding strength thereof can be readily and simply controlled. Moreover, the presence of the coal resin effects a marked reduction in the nerve of the resulting film, which exhibits very short legs.

The viscosity of chloroprene rubbery polymer cements is substantially lowered by the inclusion therein of this Utah-type coal resin, the presence of which, accordingly, permits additional polymer as well as larger amounts of compounding materials to be incorporated in such a cement. A longer life and a greater stability are imparted to such cements by this coal resin, which prevents or inhibits gelling of the cement even upon standing for a relatively long period of time. The present cements remain suitable for use more than twice as long as straight chloroprene rubbery polymer cements. In addition, the tensile strength and the shear adhesion of this type of cement are considerably improved by the incorporation of the coal resin therein.

A particular advantage of the use of a Utah-type coal resin in the preparation of chloroprene rubbery polymer cements is that the milling of the polymer with its attendant dangers can be entirely eliminated. In the production of such a cement in accordance with my invention, solution or dispersion of the rubbery polymer in the cement solvent is simply effected by directly dissolving or dispersing the polymer and the coal resin in the solvent. The coal resin appears to act as a solubilizer for or as a catalyst for the solution of the rubbery polymer, and relatively large amounts of the polymer can be dissolved in the rubber cement solvents in this manner. Moreover, the use of the coal resin in the preparation of such cements insures against premature curing of the polymer stock and provides for a better dispersion of the compounding materials throughout the cement.

A further advantage of the present coal resin-containing chloroprene rubbery polymer cement is the excellent solvent release obtained. This characteristic results in a fast-drying composition and, moreover, enables somewhat slower evaporating solvents to be substituted for a portion of the customary rubber cement solvents.

The Utah-type coal resin increases materially the resistance of the chloroprene rubber cement to alkalies, alcohols, and water. Moreover, such compositions are heat-stable to temperatures on the order of 300° to 350° F. and are suitable for use as gasket cements.

The coal resin which I incorporate with chloroprene rubbery polymers in accordance with my invention is derived from resin-bearing coals such as those found in extensive deposits in Utah. These coals, particularly those obtained from the Utah deposits, contain substantial percentages (up to 5% and more) of such resinous material, which can be separated and recovered therefrom in various manners. In accordance with the present invention, the resin is preferably employed in a coal-free condition. It can advantageously be recovered from the coal by the following two-stage procedure:

The resin is first separated from the bulk of the coal by aqueous flotation as described, for example, in Green, 1,773,997. The resulting resin concentrate, which still contains an appreciable proportion of coal (up to 15 to 20%) admixed therewith, is then extracted with a solvent composed essentially of saturated hydrocarbons having 6 or less carbon atoms, hexane being a preferred solvent, in accordance with the disclosure of the copending Lee application, Serial No. 515,804, filed December 27, 1943, now abandoned, to provide a filterable solution. The insoluble material including the coal is separated from the resulting resin solution by filtration, and the extracted resin itself is then recovered in a substantially coal-free condition by vaporization of the solvent from the solution. If a light-colored resin product is desired, the resin solution may be additionally filtered through a bed of activated clay or the like.

A typical Utah-type coal resin, recovered in this manner, is soluble in ethers, petroleum and coal-tar hydrocarbons, and vegetable oils, partially soluble in esters and ketones, and insoluble in the lower alcohols. The following physical and chemical characteristics are typical of a representative Utah-type coal resin which has been recovered by extraction with hexane:

Specific gravity_____ 1.03–1.06
Softening point (mercury method)_ 160° C.
Melting point (mercury method)____ 165°–180° C.
Refractive index_____ 1.544
Physical state_____ Brittle solid
Acid value_____ 6–8
Iodine number_____ 100–140
Molecular weight (average)_____ 1000
Analysis:
    Carbon_____ 86.95%
    Hydrogen_____ 11.10%
    Oxygen_____ 1.95%

The coal resin is advantageously compounded with a chloroprene rubbery polymer in an amount ranging from about 5 to 200% based on the weight of the polymer. Within this range of proportions the most significant increase in solubility or dispersibility of the polymer in rubber cement solvents occurs, and the most satisfactory adhesive compositions can be prepared. Excellent adhesiveness is exhibited even by the compositions in the upper part of this range. Less than 5% of the coal resin may be used, but in such case the increase in the solubility of the polymer and the improvement in the adhesive qualities of the cement may be insufficient to be effective. More than 200% of the coal resin may also be employed, but then the value of the rubbery content of the resulting cement begins to be lost, and there is no corresponding improvement in the composition as an adhesive. In any event, sufficient coal resin should be incorporated with the chloroprene polymer to produce a cement having the adhesive characteristics necessary for the desired purpose.

In the preparation of the rubber cement, a master batch of the rubbery polymer and any extenders, accelerators, and other compounding materials desired may be prepared on a mill, and this master batch can then be added together with additional polymer, the coal resin, and the necessary solvent to any suitable churning equipment. Advantageously, however, the rubbery polymer, the coal resin, the compounding material and the necessary solvent are placed directly in any suitable mixing equipment and are mixed therein for the time required to effect complete solution or dispersion of the polymer, the coal resin and the other ingredients. Milling of the polymer itself for the purpose of sheeting may be resorted to prior to this operation if the polymer is initially obtained in pieces too large for convenient handling by the dissolving or dispersing equipment or for efficient solution.

Other organic solvents besides the aliphatic and the aromatic hydrocarbons mentioned herein may be used in the formulation of our improved rubber cements, the choice of solvent being governed by the particular conditions under which the cement is to be used. The solvent selected should, of course, be compatible with the rubbery polymer and the coal resin and should possess the volatility characteristics requisite for the desired application.

The following examples illustrate typical adhesive formulations of chloroprene rubbery polymers compounded with a coal-free Utah-type coal resin:

Example 1

The following formulation represents a typical rubber cement prepared from a chloroprene rubbery polymer and a coal resin (parts by weight):

Neoprene (chloroprene rubbery polymer)____ 15.0
Utah-type coal resin (coal-free)_____ 15.0
Zinc oxide_____ 1.0
Butyraldehyde-butyl amine_____ 0.2
Benzene _____ 48.8
Petroleum naphtha_____ 20.0

The rubbery polymer, the coal resin, and the other solid ingredients are dissolved and/or dispersed in the solvent, and the resulting mixture is agitated for several hours until all the solid ingredients are dispersed or dissolved in the benzene. The resulting cement has excellent adhesive qualities.

Example 2

Another typical chloroprene rubber cement formulation is represented by the following (parts by weight):

Neoprene _____ 15.0
Utah-type coal resin (coal-free)_____ 7.5
Carbon black _____ 7.5
Zinc oxide _____ 1.0
Butyraldehyde-butyl amine _____ 0.2
Xylene _____ 68.8

This adhesive composition, which is prepared in the manner described in Example 1, is readily brushable, does not dry too rapidly, and is opaque.

Example 3

A rubber cement containing a very high proportion of coal resin to chloroprene rubbery polymer is represented by the following formulation:

Parts by weight
Neoprene _____ 15.0
Utah-type coal resin (coal-free)_____ 30.0
Zince oxide _____ 1.0
Accelerator _____ 0.2
Toluene _____ 75.0

This composition is prepared in the same manner as the previous two compositions and is useful, inter alia, in bonding rubberized fabric to metal.

I claim:

1. An adhesive composition comprising a solution in an organic solvent therefor of a chloroprene rubbery polymer and 5 to 200%, based on the weight of the polymer, of a resin consisting essentially of carbon and hydrogen, having an average molecular weight of 1,000 and a refractive index of 1.544 and occurring in Utah resin-bearing coals.

2. In the preparation of a solution of a chloroprene rubbery polymer in an organic solvent therefor, the step which comprises dissolving the rubbery polymer in the organic solvent in the presence of 5 to 200%, based on the weight of the polymer, of a resin consisting essentially of carbon and hydrogen, having an average molecular weight of 1,000 and a refractive index of 1.544 and occurring in Utah resin-bearing coals.

LINO J. RADI.

REFERENCES CITED

The following references are of record in the file of this patent:

UNITED STATES PATENTS

| Number | Name | Date |
| --- | --- | --- |
| 2,163,609 | Macdonald | June 27, 1939 |
| 2,351,735 | Bake | June 20, 1944 |
| 2,364,090 | Nagelvoort | Dec. 5, 1944 |
| 2,400,612 | Sprague | May 21, 1946 |

OTHER REFERENCES

Nagelvoort, Chem. & Met. Eng. 49 No. 10, pages 80–82 (1942).